United States Patent [19]

Stiger

[11] 4,082,474

[45] Apr. 4, 1978

[54] DRILL ATTACHMENT

[76] Inventor: Darrel E. Stiger, 3831 S. Ames St., Denver, Colo. 80235

[21] Appl. No.: 757,701

[22] Filed: Jan. 7, 1977

[51] Int. Cl.$^2$ .......... B23B 39/00

[52] U.S. Cl. .......... 408/110

[58] Field of Search .......... 408/110, 111, 112

[56] References Cited

U.S. PATENT DOCUMENTS

| | | | |
|---|---|---|---|
| 2,680,435 | 6/1954 | Gonzalez | 408/110 |
| 2,849,900 | 9/1958 | Heidtman, Jr. | 408/112 |
| 2,888,965 | 6/1959 | Phillips | 408/110 X |
| 3,534,639 | 10/1970 | Treichler | 408/112 |
| 3,874,810 | 4/1975 | Russell | 408/110 |

*Primary Examiner*—Harrison L. Hinson
*Attorney, Agent, or Firm*—C. B. Messenger

[57] ABSTRACT

An attachment for motor powered drills for accurately positioning drill bits when holes of regulable depth and angle are to be drilled in a work piece. An open-centered base for contact with the work piece provides journal supports for paired rotatable trunnions that may reciprocally receive guide rods disposed above the base and at right angles to said trunnions. Paired guide sleeves of a frame attached to the drill motor and disposed parallel to the axis of the drill reciprocally receive the guide rods, and the drill and its bit are, accordingly, movable along the guide rods to cut a desired hole in the work piece. Index means and detents facilitate varied angular positionings for said trunnions and guide rods whereby holes that are angularly disposed with respect to the work piece may be drilled. The guide rods may be extended through the base to provide accurate centering of drilled holes, and a separate jig or vise is provided that holds the drill attachment and drill, etc. in adjusted lateral positions. The frame attached to the drill motor may include a central bearing receiving a shaft extension that is applied to the shaft of the drill motor when the chuck thereof is removed, or the frame may be made integral with the end plate or gear housing of the drill motor.

13 Claims, 11 Drawing Figures

DRILL ATTACHMENT

BACKGROUND OF THE INVENTION

Motor powered drills or drill motors are now owned and used by many craftsmen and home owners. With the ready availability of such drills, it is still noted that many users have difficulty in accurately locating and drilling desired openings and holes. In order to improve the accuracy of holes drilled with the smaller drill motors, others have previously provided stands that would receive and hold a drill so that the drill and the bits therein could be accurately moved toward intended work pieces. This previous type of stand support is relatively expensive, and in general such stands do not provide features for centering the drilled hole in the work piece or for easily and conveniently drilling angularly disposed holes. It is believed that an attachment providing such improved utility that is of relatively smaller size, lesser cost, and greater portability would be advantageous.

SUMMARY OF THE INVENTION

The present invention provides an attachment for use with drill motors in order to facilitate the drilling of holes of regulable position and angularity. Essentially, the attachment comprises a base for engagement with a work piece and a frame that is attached to the drill motor either as a part of the encasing structure for said drill motor or as a separate component that is attached to and centered on the shaft of said drill motor. Guide rods interconnect the base and frame with the guide rods themselves being received in angularly positionable trunnions rotatably mounted on the base. The rods are reciprocally received through paired sleeves of the frame so that the drill and its frame may be moved along the guide rods to bring any cutting bit held by the drill into guided contact with the work piece. The guide rods may be disposed at varied angular positions with respect to the base and movement of the drill toward the base may be regulated. Accordingly, angularly disposed holes and holes of regulable depth may be drilled. A hole centering feature and a vise or jig support for the drill attachment may be used so that the positioning of single or multiple holes is controllable.

DESCRIPTION OF THE PREFERRED EMBODIMENTS

Figure 1:
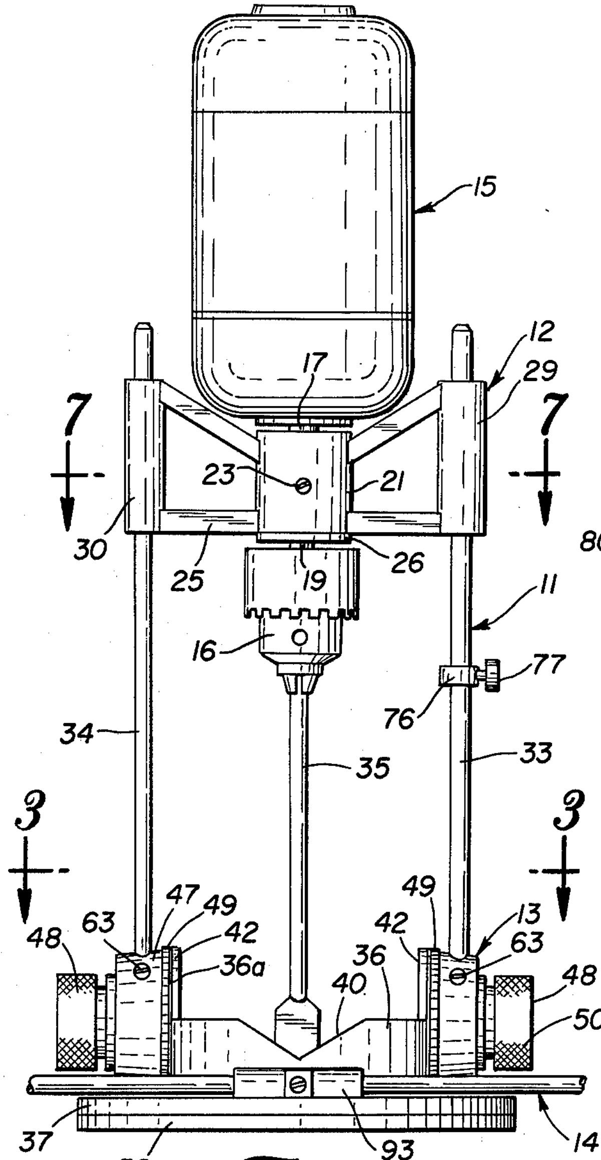
FIG. 1 is a front elevation of a first embodiment drill attachment.
Figure 2:
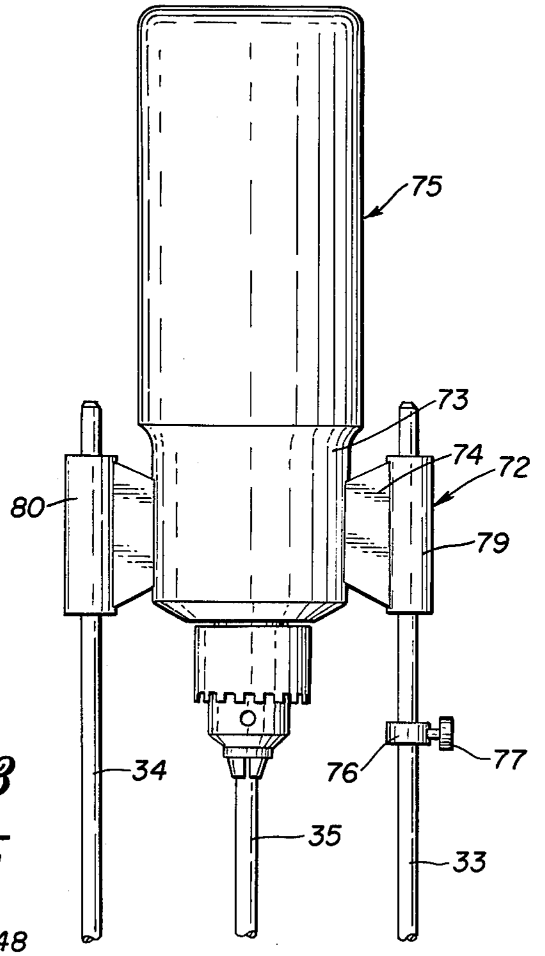
FIG. 2 is a similar front elevation of an alternate embodiment of the invention.

Features of a preferred embodiment of the invention are shown in FIGS. 1 and 3 through 10, with changed and distinctive features of an alternate embodiment being shown in FIG. 2. The details shown in FIGS. 3 through 8 are common to either embodiment of the invention.

Figure 9:
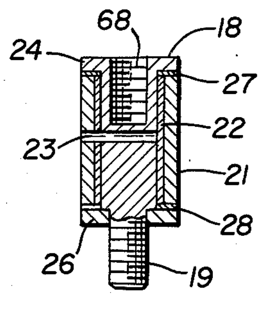
FIG. 9 is a partial vertical cross-section taken along the line 9—9 of FIG. 7 to show features of a shaft extension component.

In the FIG. 1 embodiment a drill attachment 11, which includes major frame 12, base 13 and vise-jig 14 components is applied to a drill motor 15. For this embodiment a chuck 16 of the drill or drill motor has been removed from such drill motor 15 and the output shaft 17 thereof. A shaft extension 18, the features of which are more clearly shown in FIG. 9, is applied to the drive shaft 17 of the drill motor, and the chuck 16 is then itself applied to the stub shaft 19 which extends beneath a central hub 21 of the frame component 12. A bearing 22 is disposed interiorly of the hub 21, and, accordingly, the shaft extension 18, the stub shaft 19 and the drill chuck 16 are then free to rotate with the shaft 17 of the drill motor. A hole adapted to receive a stop pin to prevent rotation of the shaft when a chuck is being applied also provides an oil hole 23 communicating with the interior bearing 22 for lubrication purposes. An enlarged shoulder 24 is provided on the upper end of the shaft extension body, and a thrust nut 26 can be applied to the threaded stub shaft 19; accordingly, the shaft extension is held securely for free and accurate rotation within the central hub 21. The preload on thrust bearings 27 and 28 is adjusted by loosening or tightening the thrust nut 26.

Webs 25 extend laterally and outwardly from the hub 21 to provide support for guide sleeves 29 and 30. Bushings 31 and 32 are provided interiorly of the guide sleeves 29 and 30 with the central bore thereof being adapted to closely and reciprocally receive guide rods 33 and 34. Such guide rods 33 and 34 in either embodiment of the invention then extend forwardly from the drill 15 in positions parallel to the axis of the output shaft 17 for such drill motor. The drill motor 15, the drill attachment frame 12, the drive chuck 16, and any drill bit 35 received therein may then be moved reciprocally along the guide rods toward and away from work pieces that are to be drilled.

Figure 3:
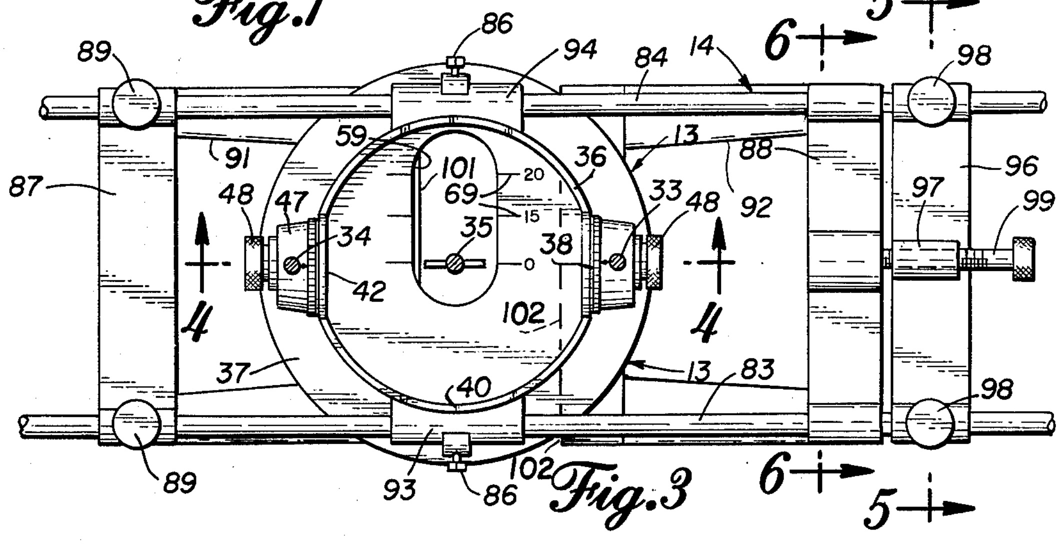
FIG. 3 is a top plan view from the line 3—3 of FIG. 1 showing the base of such drill attachment and further presenting additional details of a vise-jig for use with such attachment.
Figure 4:
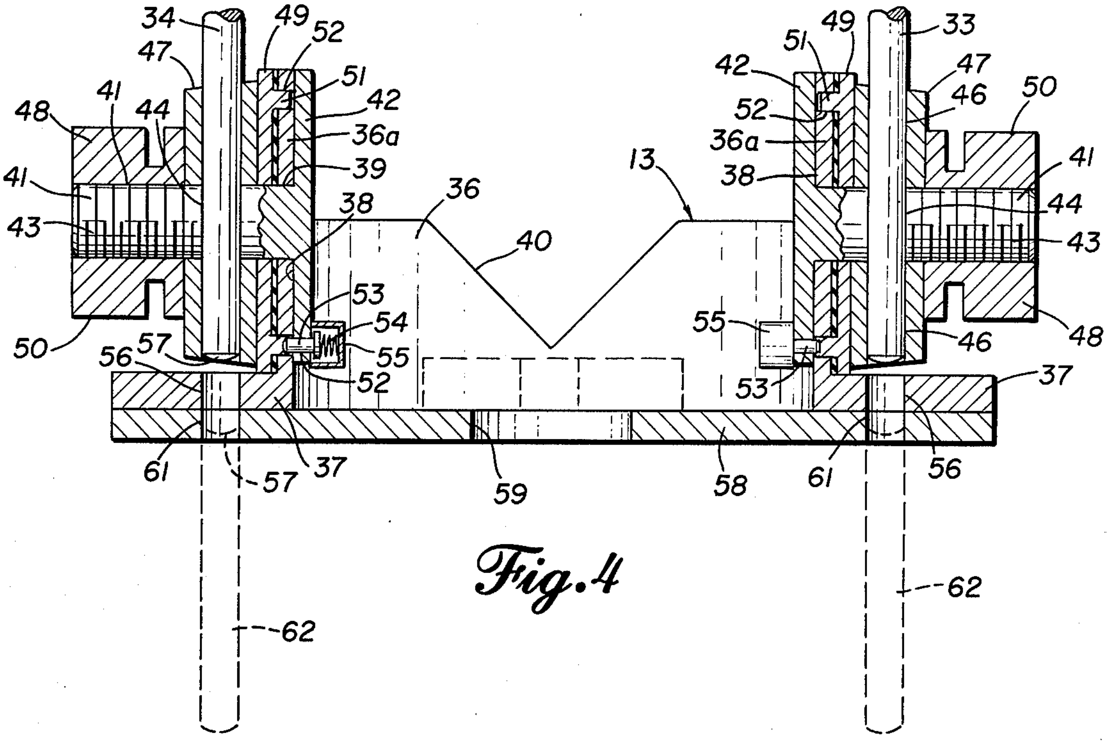
FIG. 4 is a cross-sectional elevation taken along the line 4—4 of FIG. 3.
Figure 5:
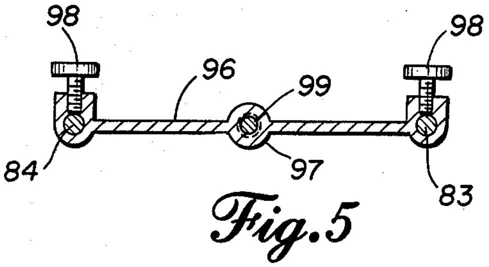
FIG. 5 is a cross-sectional elevation taken along the line 5—5 of FIG. 3.
Figure 6:
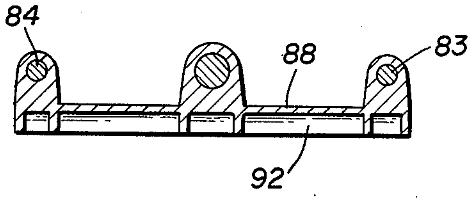
FIG. 6 is a cross-sectional elevation taken along the line 6—6 of FIG. 3.
Figure 7:
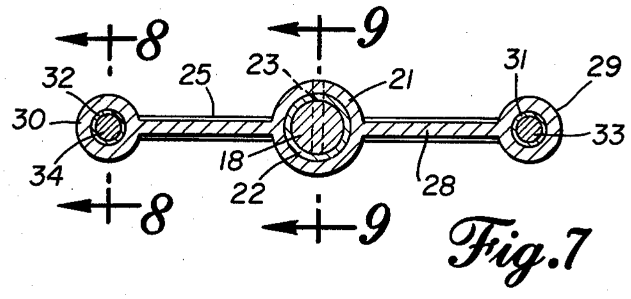
FIG. 7 is a horizontally disposed partial cross-section taken along the line 7—7 of FIG. 1.
Figure 8:
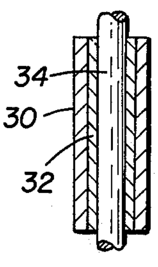
FIG. 8 is a vertical cross-section taken along the line 8—8 of FIG. 7.

In order to support the guide rods 33–34 at desired angular positions and in order to provide control for the depth of holes that are to be drilled, a support base 13 is provided. Such base component, as shown in FIGS. 1, 3 and 4, is made up of a flanged, open-centered support collar 36 with the cylindrical extent thereof extending upwardly above a flange 37 that may be disposed in contact with the intended work piece. The upwardly extending cylindrical collar is preferably provided with diametrically opposed notches 40 that are adapted to receive round shaped objects and to hold such objects in center position with respect to the base and, accordingly, to any drill bit 35. At lateral sides of collar 36 upwardly extending ear extensions **36*a* are provided which have a flat surface 38 disposed toward the center of said support collar 36. Ear extensions 36*a* further provide central openings 39 through which the shank 41 of a trunnion assembly 42 is extended. Shanks 41 are provided with threads 43 and a cross hole 44 through which the guide rods 33 and 34 may be extended. Such guide rods are then disposed at right angles to the shanks 41 of the trunnion assembly 42 and in a plane that is perpendicular or normal with respect to the bottom surfaces of the flanges 37 and any work piece on which the base is disposed. The guide rods 33–34 also may pass through a bore 46 in bushing 47. The bushing 47 then moves with the guide rods, and it will also turn with the trunnion assembly 42 and its shank 41**.

A binding nut 48 that preferably has a serrated or knurled outer edge 50 is engaged to the threads 43 of the trunnion shank 41, and when the binding nuts 48 are tightened, the guide rods will be held in their adjusted angular positioning. In order to set the guide rods at desired angles other than 90° or vertical with respect to the flat lower surface of the base component 13, an index washer 49 is provided that has degree markings on its outer surface. The index washer 49 is itself held in fixed position with respect to the ear extension 36*a* of support collar 36 by clutch pins 51 on the index washer 49 that are engaged in drilled openings 52 passing through the ear extensions 36*a*. A plurality of such openings 52 may be provided at various angular positions, and the same openings that receive the clutch pins 51 may, in fact, be adapted to receive the end of a detent pin 53 of detent assembly 55 that is mounted on the head of trunnion 42 for movement therewith. A spring 54 urges the end of detent pin 53 into such openings 52 so that the trunnions 42 are themselves held in specific adjusted angular positionings. The detent pin receiving openings 52 may be provided in the ear extensions 36*a* at positions corresponding to 15°, 30° and 45° away from the vertical disposition. Since angular index markings and a reference line may be provided on the index washer 49 and on the bushing 47, any desired angular position for a hole that is to be drilled can be obtained.

Since the predominant disposition for holes is at 90° to the material surface being drilled, holes 56 of size adapted to admit the guide rods 33 or 34 are provided through the flange 37 of support collar 36 at a position corresponding to a direct vertical 90° placement for the guide rods. The ends 57 of the guide rods may then be extended through such openings 56 as indicated by the dotted outline representations in FIG. 4. When so extended, the guide rods will be vertically disposed, and the trunnion assemblies cannot be rotated to any other adjusted angular positions.

For some uses of the drill attachment, a sole plate 58 can be provided for the base 13. This sole plate, which has a central opening 59 of lesser size than the full diameter opening for the support collar 36 will usually be used when holes of smaller size are to be drilled. The sole plate itself provides openings 61 in position of registration with respect to the openings 56 in flanges 37, and the guide rods 33–34 may likewise be extended through these openings 61. With additional guide rod extension, as illustrated in FIG. 4 and identified by number 62, a separate and beneficial use is derived, since the extended guide rods can be used to provide accurate centering of the drill attachment 11 with respect to the edges of boards or of metal or other work pieces that are to be drilled. For this operation the drill attachment with the guide rods extended, as shown at 62, is applied to the work piece. The entire drill and drill attachment are then rotated to bring the guide rods into contact with opposite lateral edges of the work piece. When the guide rods are thus in contact, a drill bit that is to be used to dril the opening will be disposed at the true center of the work piece. If the guide rods are to be extended through the trunnions 42 and even through the sole plate, they may be held in the desired extended position by tightening the set screw 63 shown in FIG. 1. These set screws are threadedly received in the bushings 47 at the position assuring engagement against the sides of the guide rods 33 and 34.

Figure 10:
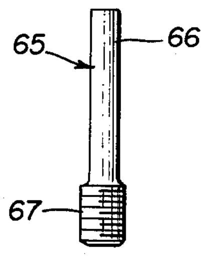
FIG. 10 is a side elevation of a connector bit.
Figure 11:
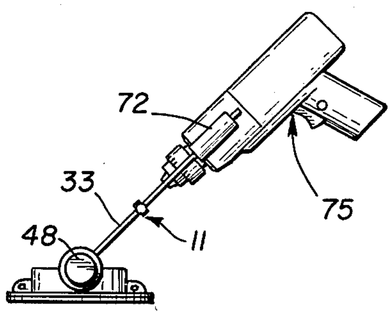
FIG. 11 is a side elevation at smaller scale illustrating angular dispositions for said guide attachment.

A preferred embodiment of the present drill attachment would include all of the features and components as shown in FIG. 1. For such embodiment the essential components are the frame assembly 12, the base 13, and the guide rods interconnecting such components. The jig support rods of vise-jig 14 shown in such FIG. are not essential to such embodiment. The embodiment does, however, include the shaft extension 18 which is disposed within the central hub 21 of frame 12, and it would also include a drill chuck, such as the drill chuck 16, which could likewise be used with such attachment, though it would not necessarily be sold therewith, since most drills are initially provided with such chucks. One potential use of a drill attachment 11 that would require the provision of a separate chuck, however, is suggested. If a connector bit 65, as shown in FIG. 10, is provided having a shaft 66 and a threaded end 67 and if the threads are of a size to be received in the threaded receptacle 68 of shaft extension 18, as shown in FIG. 9, the shaft 66 can then be secured in a chuck of a conventional drill motor in its unmodified or unchanged conformation. With this arrangement the drill motor and its attached chuck would drivingly rotate the described connector bit 65, and, accordingly, the shaft extension 18 of drill attachment 11 could be rotated to correspondingly rotate the second applied chuck 16 and any drill bit 35 received therein. Through use of a connector bit 65, the usual type drill motor does not have to be modified to receive the frame 12 of drill attachment 11, and such drill motor is always readily available for regular uses.

It is further realized that all uses of a drill motor do not require accurate hole positioning. For ordinary uses the frame component 12 can be left in place, and the sleeves 29 and 30 can simply be disengaged from their respective guide rods 33–34. After completion of tasks, the drill motor and its still attached frame 12 can be returned to a position of engagement with the guide rods 33 and 34.

In FIGS. 1, 3 and 4 use of a sole plate 58 is illustrated. The sole plate 58 has an elongated or oval shaped opening 59, since drill bits 35 might not pass through a central opening if the drill supporting guide rods are disposed at angular positions. Angle markings 69 are provided on the upper surface of the sole plate to facilitate placement of the drill attachment when vertical or inclined holes are to be drilled. The angle locator markings 69 are provided along the elongated edges of the opening 59 at positions corresponding to particular angular dispositions for the guide rods. These marks, which may be provided for 15° and 30°, etc., can facilitate the prepositioning of the drill attachment 11 when holes of a particular inclination are to be drilled.

In a second embodiment of the invention as shown in FIG. 2, a rigid type of frame 72 is provided. This frame structure is made integrally with an end plate or gear housing 73 of a drill motor 75. The webs 74 extend outwardly to provide support for sleeves 79 and 80. The sleeves are of construction similar to that for the sleeves 29 and 30, and again they reciprocally receive the guide rods 33 and 34. It is intended that this type of frame 72 will be provided as a component of the original equipment for the drill motor 75. A base 13 and guide rods will then be separately provided for purchase when users want to have hole centering and angular positioning features. The base for this embodiment of the invention can be identical with the base 13 previously described.

For either the FIG. 1 or FIG. 2 embodiment, the depth of the hole to be drilled can be closely regulated. A stop or stops 76 that move reciprocally along the guide rods 33–34 may be held in adjusted position therealong by tightening a provided set screw 77. When the sleeves for the frame structures comes into contact with such stops, the hole being drilled will be bottomed.

The features of a vise-jig 14 which are shown in FIGS. 1, 3, 5 and 6 may be provided where added utility for the drill attachment 11 is desired. The purpose of such vise-jig is to hold the drill attachment 11 in regulated position with respect to a work piece that is to be drilled. Support rods 83 and 84 of the vise-jig 14 are extended through bosses 93 and 94 provided by the base 13. The base 13 and its bosses 93–94 may be moved reciprocally along the support rods 83 and 84 to adjusted positions. When the desired position is obtained, the lock screws 86 may be engaged. Jaw elements 87 and 88 are also provided that may be moved along the support rods 83 and 84. The fixed jaw 87 has finger screws 89 that may be tightened to hold the jaw 87 in a desired position. When in such position, inwardly extending arms 91 that pass beneath support rods 83 and 84, the base 13 and its sole plate 59 provide support for a work engaging jaw face 101 that can be engaged against a side of a work piece. At the same time the extension arms 92 for moving jaw 88 support an angle bar 102 having a downwardly turned leg for engagment with an opposite side of such work piece. An anchor bar 96 providing a vise nut 97 is held in adjusted positions along the support rods 83 and 84 by tightening the set screws 98. Thereafter vise screw 99 may be adjusted to push the moving jaw 88 and its jaw face 102 into secure engagement with the work piece. Since the jaws 87 and 88 may be moved to varied positions along the support rods 83–84 to be tightly held against a surface of the work piece through use of vise screw 99, the drill attachment 11 can itself be held in adjusted positions across the top of the work piece so that straight or angular holes may be conveniently drilled at varied positions across the work piece. When holes are to be drilled for dowels and guide pins, etc., use of this vise-jig in conjunction with the described drill attachment is highly beneficial.

I claim:

1. A position, angle and depth of hole regulating attachment for motor powered hand tool drills that provide a housing enclosing a drive motor and an output shaft for the driving rotation of drill bits that are used for cutting holes in an intended work piece comprising a frame component for attachment to said drill, a plurality of guide sleeves on said frame disposed parallel to the axis of said output shaft, an open-centered base component for contact with said work piece, rotatably mounted trunnions on said base disposed outwardly from the center thereof, and guide rods for interconnecting said frame and the trunnions of said base component, said trunnions providing means for reciprocally receiving said guide rods whereby the drill and any drill bit attached thereto are reciprocally movable along a path defined by said guide rods toward and away from said work piece.

2. The drill attachment as set forth in claim 1 and further comprising a stop element for reciprocal engagement on at least one of said guide rods at positions for selective interference with said sleeves or trunnions, and means for adjustably fixing the position of said stop on said guide rod whereby the depth of holes to be drilled may be regulated.

3. The drill attchment as set forth in claim 1 and further comprising adjustment means for said trunnions whereby said trunnions may be moved to varied angular positions with respect to said base when holes of angular disposition are to be drilled in said work piece.

4. The drill attachment as set forth in claim 3 and further comprising angle index means at said trunnions whereby selection of the angular disposition for said holes is facilitated.

5. The drill attachment as set forth in claim 1 wherein said trunnions have holes therethrough at a disposition of ninety degrees with respect to the axis of said trunnions for use as said reciprocal receiving means and wherein said base provides holes in positions of alignment with respect to the holes through said trunnions when the trunnions and the holes therein are at a position of 90° inclination with respect to the work piece that is to be drilled.

6. The drill attachment as set forth in claim 5 wherein said guide rods are extendable through said trunnions and base holes for contact with side edges of said work piece to facilitate the centering of holes that are to be drilled in said work piece with respect to the side edges thereof.

7. The drill attachment as set forth in claim 1 and further comprising threaded adjustment means for said trunnions whereby said trunnions may be moved to varied angular positions with respect to said base when holes of angular disposition are to be drilled in said work piece, angular position locator stops operatively intermediate said base component and trunnions wherein the trunnions may be moved to fixed angular positions, and nut threaded means for holding said locator stops in engagement at selected angular positions.

8. The drill attachment as set forth in claim 7 wherein said selector stops comprise a plurality of pin and hole components with the holes thereof being provided by said base.

9. The drill attachment as set forth in claim 8 and further comprising detent means on said trunnions for selective engagement in the locator stop holes of said base to hold the trunnions and guide rods at selected angular positions.

10. The drill attachment as set forth in claim 1 and further comprising a sole plate for said base component providing an opening of lesser size than said open-centered base, and index markings on said sole plate for locating the center of holes that are to be drilled through use of said attachment.

11. The drill attachment as set forth in claim 10 wherein said sole plate opening is of elongated configurations and index markings are additionally provided for holes that are to be drilled at other than 90° disposition with respect to said base and sole plate.

12. The drill attachment as set forth in claim 4 and further comprising a jig-vise support for said drill attachment inclusive of support rods engageable to said base component in position parallel to the work piece, and vise jaws for disposition on said support rods and extending below said base for engagement with the work piece to hold said base and drill attachment in fixed position with respect to the work piece.

13. A drill attachment as set forth in claim 12 and further comprising adjustment means for adjusting the relative positions of said support rods with respect to said base component, and a vise screw for adjustably engaging at least one of said vise jaws with respect to said work piece.

* * * * *